United States Patent [19]
Cubukciyan et al.

[11] Patent Number: 5,289,554
[45] Date of Patent: Feb. 22, 1994

[54] KEYING ELEMENT FOR FIBER CONNECTOR

[75] Inventors: Nuran Cubukciyan, Englewood Cliffs, N.J.; James R. Bylander, Austin, Tex.; Julius T. Puchammer, Edison, N.J.

[73] Assignee: Minnesota Mining and Manufacturing Company, St. Paul, Minn.

[21] Appl. No.: 952,949

[22] Filed: Sep. 29, 1992

[51] Int. Cl.$^5$ .............................. G02B 6/26
[52] U.S. Cl. ........................ 385/76; 385/77; 385/83; 385/78; 439/680; 439/681
[58] Field of Search .............. 385/76, 77, 78, 81, 385/56, 53, 60, 66, 73, 75, 83; 439/677, 680, 681

[56] References Cited

U.S. PATENT DOCUMENTS

| | | | |
|---|---|---|---|
| 3,566,340 | 6/1968 | Jayne et al. | 339/186 |
| 3,576,519 | 5/1970 | Jayne et al. | 339/186 |
| 3,611,272 | 7/1970 | Fairbairn et al. | 339/184 M |
| 3,614,711 | 10/1970 | Anderson et al. | 339/90 R |
| 3,714,617 | 1/1973 | Bright et al. | 439/681 X |
| 3,771,108 | 11/1973 | Haffner et al. | 439/488 |
| 3,944,316 | 3/1976 | Newman et al. | 439/181 X |
| 3,984,169 | 10/1976 | Armstrong et al. | 439/341 X |
| 4,032,213 | 6/1977 | Snyder et al. | 439/681 X |
| 4,159,862 | 7/1979 | Funck et al. | 439/681 X |
| 4,345,813 | 8/1982 | Hatch | 439/681 X |
| 4,350,409 | 9/1982 | Kato et al. | 439/681 X |
| 4,386,820 | 6/1983 | Dola et al. | 439/681 X |
| 4,526,431 | 7/1985 | Kasukawa | 439/153 X |
| 4,611,887 | 9/1986 | Glover et al. | 385/71 |
| 4,762,388 | 8/1988 | Tamaka et al. | 385/58 |
| 4,779,950 | 10/1988 | Williams | 385/58 |
| 4,817,258 | 4/1989 | Waters | 29/240 X |
| 4,822,305 | 4/1989 | Waters | 439/681 X |
| 4,832,624 | 5/1989 | Waters | 439/681 X |
| 4,979,792 | 12/1990 | Weber et al. | 385/53 |
| 4,990,099 | 2/1991 | Marin et al. | 439/284 |
| 5,016,968 | 5/1991 | Hammond et al. | 385/78 |
| 5,037,175 | 8/1991 | Weber | 385/76 |
| 5,041,025 | 8/1991 | Haltmanek | 439/681 |
| 5,167,542 | 12/1992 | Haltmanek | 439/681 |
| 5,212,752 | 5/1993 | Stephenson et al. | 385/76 X |

OTHER PUBLICATIONS

Appendix F of ANSI Standard X3T9.5/84-48. (See FIGS. 4-5 of that standard). Dated Jul. 1, 1988.

*Primary Examiner*—Brian Healy
*Attorney, Agent, or Firm*—Gary L. Griswold; Walter N. Kirn; Jack V. Musgrove

[57] ABSTRACT

A fiber optic connector for a fiber distributed data interface (FDDI) has a keying element located along the centerline of the plug which may be rotated to provide different polarizations for the plug. The plug has a cable entering one end, and breaking out into two fibers which terminate in ferrules at the other end of the plug. The keying element has a post which is slidably received in a hole through the plug, the hole positioned in a groove located along the centerline of the plug; an annular flange is formed at the distal end of the post to retain it within the hole. The post is molded with a square keyway block which has two channels in its upper surface. The channels are orthogonal, and one is located along the centerline of the block while the other is located along one side of the block. The plug mates with a receptacle having a spline on its inner surface, located in one of four possible configurations near the centerline of the receptacle. The width of the spline is equal to the width of the channels in the keyway block. By pushing the distal end of the post of the keying element, the element clears the upper surface of the plug and may be rotated to one of three positions, whereby one of the channels is located at a position corresponding to the position or keying format of the spline in the receptacle. Indicia may be provided on the keying element and/or plug to designate the particular format corresponding to each orientation of the element.

16 Claims, 3 Drawing Sheets

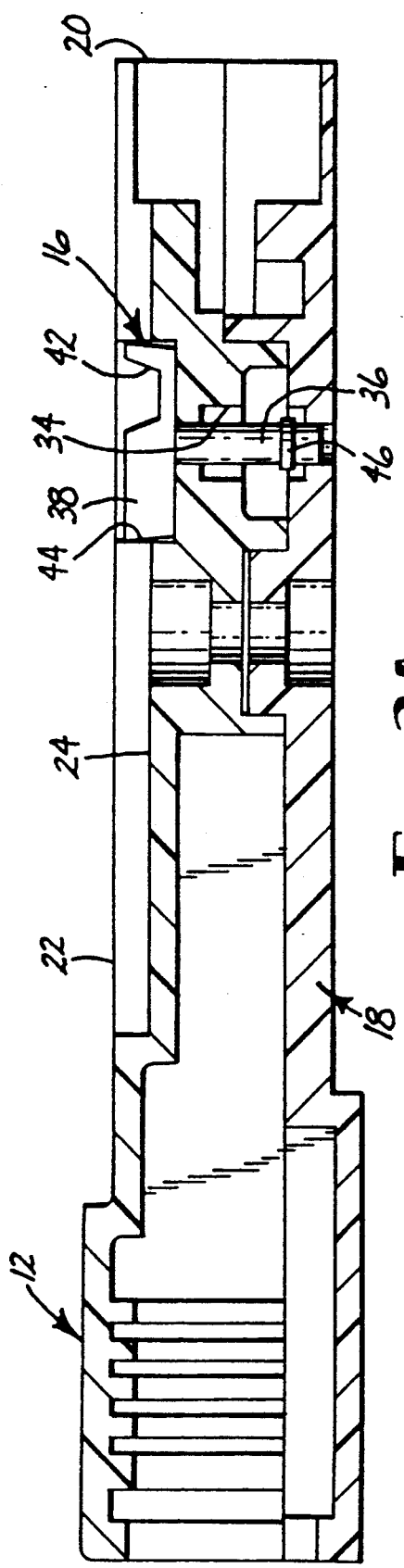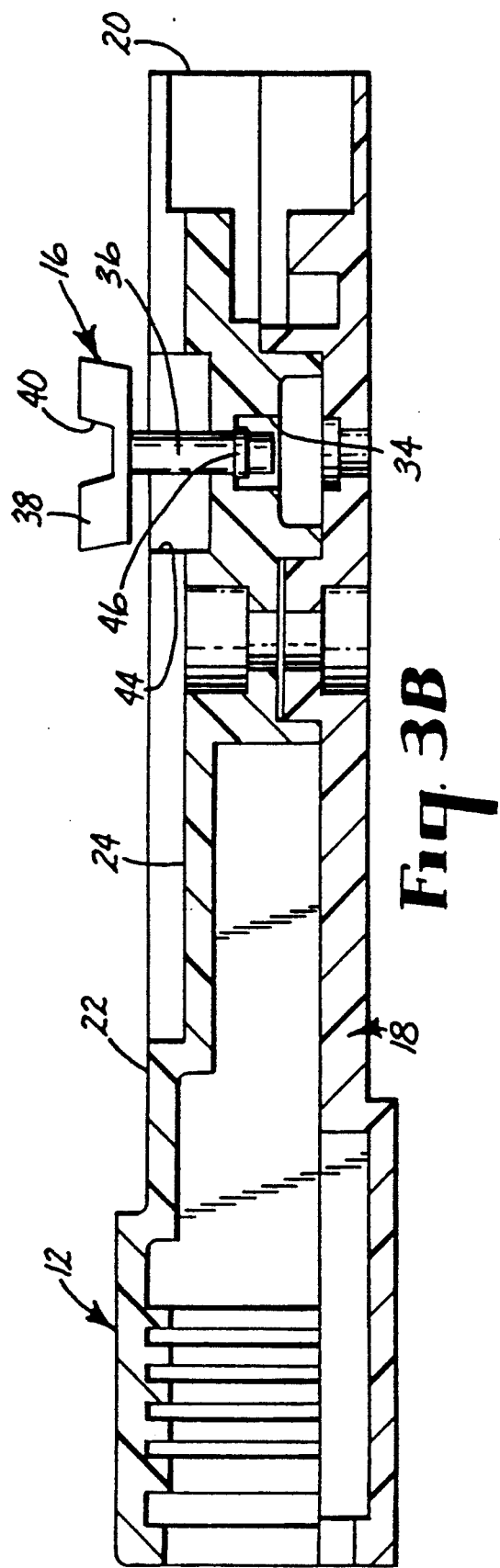

KEYING ELEMENT FOR FIBER CONNECTOR

BACKGROUND OF THE INVENTION

1. Field of the Invention

The present invention generally relates to connectors for optical fiber waveguides, and more particularly to a keying element for a fiber distributed data interface connector.

2. Description of the Prior Art

The use of optical fibers for high speed communication and data transmission via optical signals has become well established. There are already hundreds of thousands of miles of optical fiber in use today. As with copper wires, it is necessary to provide connections between optical fibers at various locations in the distribution system, whether during the installation of new fibers, or during the repair or replacement of existing fibers. It has, therefore, become imperative to provide optical fiber connectors which may be inexpensively manufactured, as well as easily assembled in the field to provide connections between existing fibers and electro-optical devices. As used herein, the term "connector" refers to a detachable and refastenable device, as opposed to a "splice" which usually provides a permanent connection.

There are several conventional optical fiber connector designs, including those commonly referred to as ST, SC, FC, D4, SMA, and biconic connectors. Each of these designs are simplex, i.e., they are used to connect a single pair of fibers, although they may be adapted for duplex use. Other connectors have been specifically designed for duplex connections, including those shown in U.S. Pat. Nos. 4,779,950, 4,979,792 and 5,016,968. The connector design shown in the latter two patents is referred to as FDDI, for Fiber Distributed Data Interface, and is used, among other things, for data transmission and reception between computer systems, particularly local area networks. A typical FDDI connector 1 is depicted in FIG. 1. The prior art FDDI connector 1 includes a body or plug 2 having a hole at one end for receiving the fiber cable 3. Cable 3 breaks out inside plug 2 into two separate optical fibers which are attached to and terminate in two ferrules 4. Plug 2 may mate with one of several different receptacles, including an active device receptacle, a transceiver adaptor, a dual ST coupling, or an FDDI-to-FDDI coupling. Latch members 5 releasably secure plug 2 in the given receptacle.

Each of these receptacles typically includes a projection or spline which acts as a key or polarizing element to insure that the particular receptacle being used is compatible with the overall data transmission system. In this regard, the American National Standards Institute (ANSI) has established several standards for FDDI receptacles, including the keying formats. The keying considerations are the subject of ANSI standard X3T9.5/84-48 (see FIGS. 4-5 of that standard, "receptacle keying detail"). Plug 2 includes a groove 6 formed along one surface thereof, designed to accommodate the projection or spline. There are four basic keying formats under this standard, denoted as A, B, M and S connections. Each format is accomplished by providing a narrow channel in one of three lateral positions along groove 6 (actually, by providing a corresponding ridge or spline in the receptacle), except for the "S" connection ("slave") which is formed by having a channel which is the full width of groove 6, i.e., an "S" receptacle has a wider spline which fills the entire groove. As viewed from the front of plug 2 (i.e., looking from the end near ferrules 4 toward cable 3), the channels for the other three formats are located as follows. For an "A" connection (denoting a main ring trunk with primary in, secondary out), the channel is located at the right side of groove 6. For a "B" connection (denoting a main ring trunk with secondary in, primary out), the channel is located at the left side of groove 6. For an "M" connection (denoting a master connection of a concentrator), the channel is located at the center of groove 6.

In order to avoid the necessity of molding four different plugs for these four keying formats, the prior art connector 1 provides the groove 6 (which is wide enough to accommodate a spline located in any of the three lateral positions) in conjunction with three different keying elements which fit into a hole 7 in groove 6. Each keying element has a shaft which fits into hole 7, and a cross-member which has the narrow channel in the appropriate lateral location. In FIG. 1, two such keying elements are shown, "M" keying element 8, and "A" keying element 9; the "S" format is inherent by simply not placing any element into hole 7. The prior art keying elements are used interchangeably by removing one element and replacing it with the element appropriate to that particular connection. Several problems have arisen, however, in the use of such replaceable keying elements. First of all, since the manufacturer does not know which of the formats will be needed by the user, all three of the elements must be provided. Secondly, since the elements are completely removable from plug 2, it is very easy to lose them. A related problem is the need to store the keying elements that are not presently being used, in case the user desires to later change the connection format. In the prior art design, this problem was addressed by molding storage compartments into the dust cap of the plug (the dust cap being attached to cable 3 by a tether). But the provision of the storage compartments and tether unnecessarily adds cost to the FDDI connector. Finally, the provision of three different keying elements, requiring three different molds, also adds cost to the overall system. It would, therefore, be desirable and advantageous to devise an alternative keying element which would overcome the foregoing disadvantages.

SUMMARY OF THE INVENTION

The present invention generally comprises a keying element for an FDDI connector, the element having a post for mating with a hole in the plug of the connector, and a keyway block attached to one end of the post. The keyway block has two channels therein, one centrally located, and the other located proximate one side of the block. The block is generally square in shape, with the length of a side being approximately equal to the width of the groove in the plug, and the channels are orthogonal. In one embodiment, the element may be removed from the plug, rotated, and replaced, whereby the block may be oriented at different positions to provide different keying based upon the orientation of the channels.

The groove in the plug preferably has a recess surrounding the post-receiving hole for accommodating the keyway block. The post for the block preferably includes an annular flange which prevents the post from completely exiting the hole in the recess. In this case, the post is of sufficient length, and the flange placed at the end thereof, to allow the block to be moved above the surface of the plug for rotation. The upper surface of the block may be provided with indicia, such as lettering, to indicate the particular format associated with each orientation; alternatively, the indicia may take the form of arrows, one of which always points to a letter which is formed on the surface of the plug, adjacent the recess.

BRIEF DESCRIPTION OF THE DRAWINGS

The novel features and scope of the invention are set forth in the appended claims. The invention itself, however, will best be understood by reference to the accompanying drawings, wherein:

FIGS. 3A and 3B are elevational cross-sections depicting location of the keying element of the present invention in the connector plug, and rotation of the element.

DESCRIPTION OF THE PREFERRED EMBODIMENT

Figure 1:
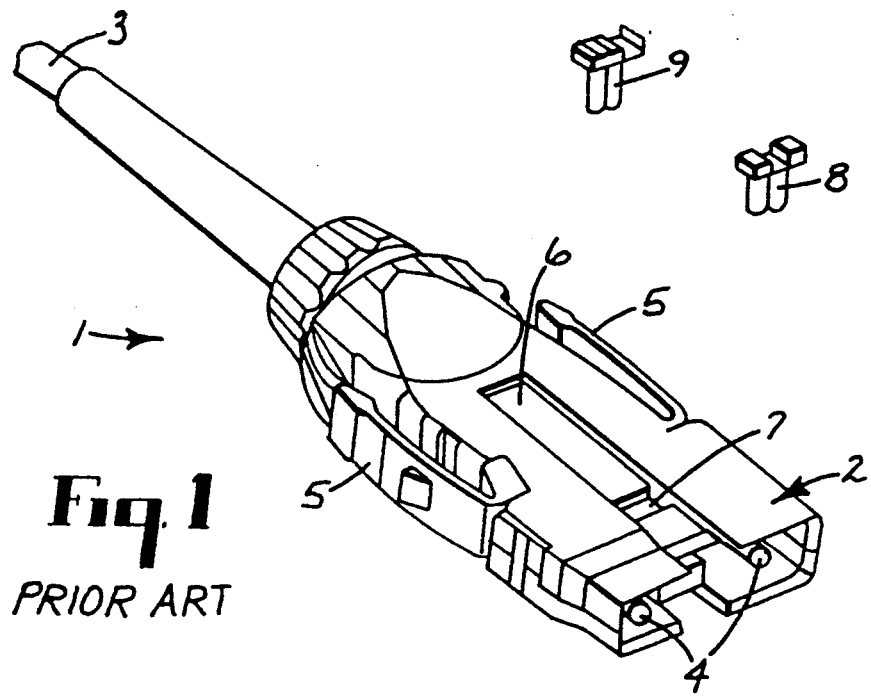
FIG. 1 is a perspective view of a prior art FDDI connector.
Figure 2:
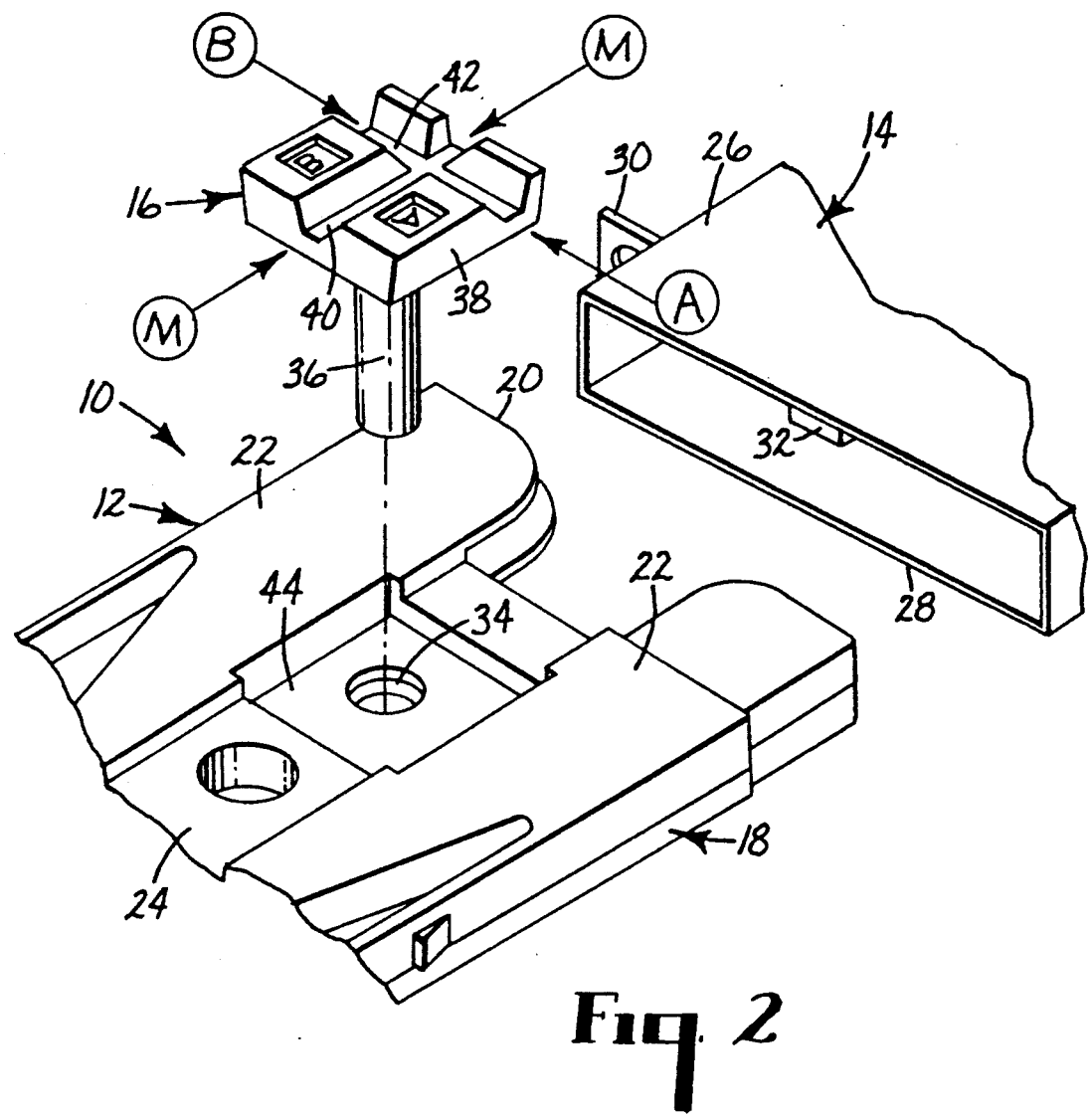
FIG. 2 is a perspective view of the connector of the present invention, showing the keying element removed from the plug.

With reference now to the figures, and in particular with reference to FIG. 2, there is depicted the FDDI connector 10 of the present invention. Connector 10 is generally comprised of a plug 12, a receptacle 14, and a keying element 16. Plug 12, which is similar to the prior art plug 2, has a body 18 with a front end 20, and an upper surface 22 on body 18 with a groove 24 formed in upper surface 22, along the centerline of body 18. Plug 12 also includes several items shown in FIG. 1, such as the fiber cable which enters the rear end of body 18 and breaks out in plug 12 into the two fibers terminating in ferrules, and the latch members. Receptacle 14 may take on many forms depending upon the particular use intended for connector 10. As noted above, receptacle 14 may be an active device receptacle, a transceiver adaptor, a dual ST coupling, or an FDDI-to-FDDI coupling. In any case, receptacle 14 is essentially comprised of a housing 26 whose near end 28 has an Opening generally conforming to the size and shape of front end 20 of plug 12. Receptacle 14 may also have means, such as a flange 30 having a hole therein, for mounting the receptacle to a frame or chassis. The inner surface of housing 26 has a ridge or spline 32 near its centerline, which is aligned with groove 24 when plug 12 is inserted into receptacle 14. The width of spline 32 is approximately one-third the width of groove 24. Body 18 and housing 26 may be formed of any durable material, preferably a polymer such as polyarylsulfone (PAS). For other details concerning the construction of plug 12 and receptacle 14, see U.S. Pat. Nos. 4,979,792 and 5,016,968, and ANSI standard X3T9.5/84-48 (appendix G: reference non-precision MIC test plug).

Plug 12 also has a hole 34 in upper surface 22, centered within groove 24, for receiving a post 36 of keying element 16. Post 36 is attached to (or integrally molded with) a generally planar keyway block 38 which is preferably perpendicular to post 36, and provides means for releasably attaching keying element 16 to plug 12. Keyway block 38 is generally square-shaped, and has two channels 40 and 42 in the upper surface thereof. Channel 40 is located along a centerline of block 38, while channel 42 is proximate one side thereof. The two channels are preferably orthogonal, and intersect, forming a "T" shape. Plug 12 also has a pocket or recess 44 for accommodating block 38. The sides of block 38 taper inwardly toward post 36 to provide a gradual leadin to recess 44 for easy insertion and removal. The provision of such a removable keyway block greatly simplifies the keying procedure. Plug 12 is shipped from the factory with keying element 16 attached to plug 12, i.e., with post 36 inserted into hole 34, and oriented in a default position, for example, with channel 40 aligned with (parallel to) groove 24. This corresponds to the "M" keying connection. If the particular plug is indeed to be used at a master connection, then the craftsperson does not need to make any adjustment to element 16 as it will already be properly positioned for such a connection. If, on the other hand, the connection is to be a trunk connection, then element 16 is removed from plug 12 (by pushing a small pointed object, such as a pencil, through the opposite side of hole 34), and rotated to the appropriate orientation, and reinserted into plug 12. The rotation will be 90° counterclockwise or clockwise, depending upon whether an "A" or "B" connection is desired, respectively (with reference to the initial orientation shown in FIG. 2). Keyway block 38 may conveniently be provided with means to indicate the proper orientation corresponding to these two connection formats, such as the letters "A" and "B" as shown in FIG. 2 which may be printed on, embossed on, or molded into block 38. Keying element 16 is also made of any durable material, preferably a polymer such as PAS.

Figure 4:
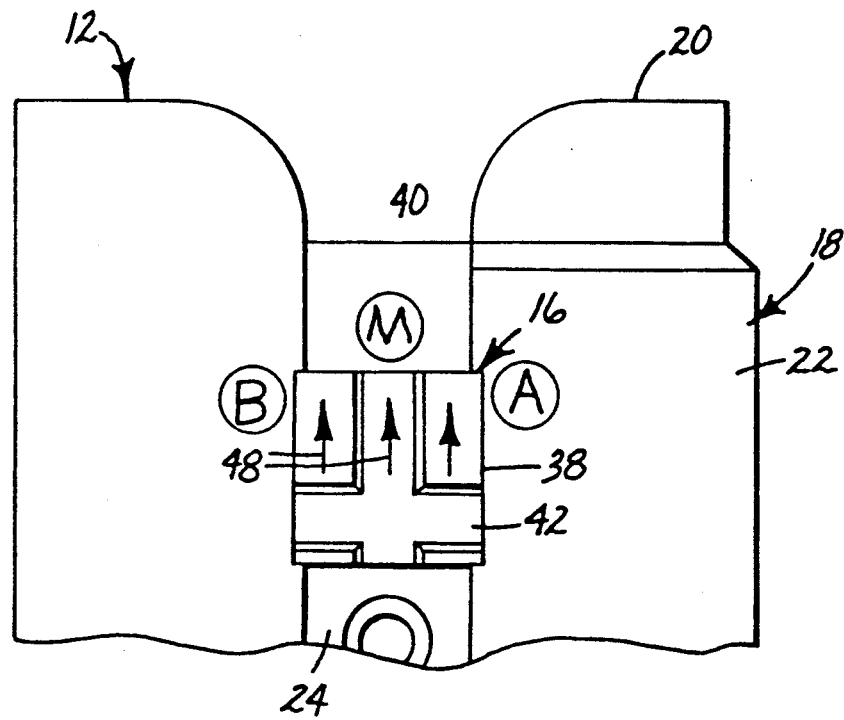
FIG. 4 is a top plan view of the connector plug illustrating the use of arrows on the keyway block and letters on the plug to indicate the keying formats.

Other improvements to the present invention are illustrated in FIGS. 3A, 3B and 4. In FIGS. 3A and 3B, which are elevational cross-sections of plug 12, it can be seen that post 36 is provided with a boss or annular flange 46. This flange prevents post 36 from completely exiting hole 34, thus preventing loss of element 16; however, (i) post 36 is sufficiently long, (ii) annular flange 46 is positioned near the distal end of post 36, and (iii) hole 34 has a wider diameter along its central portion whereby post 36 may still be pushed upward partially out of hole 34, enough for keyway block 38 to clear upper surface 22 and allow block 38 to rotate. FIG. 3A depicts element 16 in its lowered state, in the "M" connection format, while FIG. 3B depicts element 16 raised, and rotated to either the "A" or "B" formats.

FIG. 4 illustrates alternative means for indicating the particular format corresponding to each orientation of element 16. In this embodiment, keyway block 38 has three parallel arrows 48 located on block 38 (preferably molded therein), all pointing in the same general direction. However, due to their respective locations on block 38, they end up pointing to different spots on plug 12. Accordingly, plug 12 may be provided with indicia, such as symbols or the letters "A", "B" and "M", which are located on the plug (again, preferably by molding) proximate recess 44, such that only one of the arrows ever points to one of the letters, regardless of the orientation of element 16. Provision of such indicia clearly facilitates proper positioning of element 16 based upon the type of connection desired.

The dimensions of plug 12, receptacle 14 and keying element 16 may vary but, if connector 10 is intended for use in an FDDI system, then these dimensions should conform to the applicable ANSI standards. Based on those standards, the preferred dimensions are approximately as follows. Plug 12 is 9 mm×32 mm×60 mm; the ferrules are spaced 17.8 mm apart; groove 24 is 7 mm wide and 1.5 mm deep. Receptacle 14 has an opening 28 which is 32.7 mm×9.7 mm; spline 32 is 6.2 mm wide. Post 36 of keying element 16 is 6 mm long with a diameter of 1.7 mm; keyway block 38 is 8 mm×8 mm×2 mm; channels 40 and 42 are 2 mm wide, and channel 42 is 1.8 mm from the adjacent edge of block 38.

Those skilled in the art will appreciate the many advantages in using the keying element of the present invention. Since there is only one element, there is no need to provide a storage compartment for extra elements, which reduces the overall cost of the connector and, furthermore, it is much less likely that the single element will be lost, particularly when the annular flange 46 is used to secure post 36 within hole. The procedure for changing connection formats is simplified over the prior art technique since it is no longer necessary to manipulate more than one element, and the rotation of keying element 16 is easily and quickly performed. Finally, the provision of the format indicia, particularly the arrows on keyway block 38 combined with the letters on the upper surface 22 of plug 12, clarify the procedure and facilitate the expedient polarization of the plug.

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention. For example, the keying element of the present invention could be used in simplex or duplex connectors, as well as in electrical (copper) connectors, as opposed to optical fiber connectors. Also, the keyway block could be in the shape of some polygon other than a square, such as a hexagon or octagon and could accordingly have more than two channels to provide more than three different polarizations. It is therefore contemplated that such modifications can be made without departing from the spirit or scope of the present invention as defined in the appended claims.

We claim:

1. A keying element for a connector comprising:
a generally planar block member, said block member having an upper surface, said upper surface having two channels therein, and said block member further having means for indicating a keying format based on the orientation of said block member with respect to the connector, said indicating means including at least one arrow located on said upper surface of said block member; and
means for releasably attaching said block member to the connector.

2. The keying element of claim 1 wherein said block member is generally square-shaped.

3. The keying element of claim 1 wherein said two channels are orthogonal and intersect.

4. The keying element of claim 1 wherein a first one of said two channels is located along a centerline of said block member, and a second one of said two channels is located proximate a side of said block member.

5. The keying element of claim 1 wherein said block member has four sides, and each of said sides tapers inwardly toward said attaching means.

6. The keying element of claim 1 wherein said attaching means comprises a post member attached to said block member.

7. The keying element of claim 6 wherein said post member has a distal end, and an annular flange proximate said distal end.

8. A connector plug comprising:
a body having an upper surface;
a groove formed in said upper surface of said body, said body having a hole therethrough, located in said groove; and
a keying element attached to said body, along said groove, having means for selectively polarizing the plug, and further having means for releasably attaching said keying element to the plug, said attaching means including a post member inserted into said hole, said post member having a distal end, and an annular flange proximate said distal end.

9. The connector plug of claim 8 wherein said polarizing means includes a generally planar block member, said block member having an upper surface, said upper surface having two channels therein.

10. The connector plug of claim 8 wherein:
said body has a centerline and a front end;
said groove is located along said centerline of said body; and
said keying element is located proximate said front end of said body.

11. The connector plug of claim 9 wherein:
said block member is generally square-shaped; and
said two channels are orthogonal and intersect.

12. The connector plug of claim 9 wherein a first one of said two channels is located along a centerline of said block member, and a second one of said two channels is located proximate a side of said block member.

13. The connector plug of claim 9 wherein:
said block member has four sides, and each of said sides tapering inwardly toward said body; and
said body has a recess, located on said upper surface and in said groove, for receiving said block member.

14. The connector plug of claim 9 wherein said block member further includes means for indicating a keying format based on the orientation of said block member with respect to said body.

15. The keying element of claim 14 wherein:
said body has a plurality of symbols located on said upper surface, proximate said keying element; and
said indicating means comprises at least one arrow located on said upper surface of said block member.

16. A fiber optic connector comprising: a plug having
a body, said body having a first end, a second end, an upper surface, a groove in said upper surface along a centerline of said body, a recess in said upper surface along a portion of said groove, and a hole through said body, said hole centered in said recess,
a cable entering said body at said first end, said cable having two optical fibers therein, each fiber having a terminal end, and
two ferrules attached to said second end of said body, said terminal ends of said two fibers being located in said two ferrules, respectively;
a keying element having a post slidably inserted in said hole of said plug body, said post having proximate and distal ends, and an annular flange located at said distal end, and a generally planar, square keyway block attached to said proximate end of said post and perpendicular to said post, said block having an upper surface, there being first and second channels in said upper surface, said first channel located along a centerline of said block, and said second channel being orthogonal to said first channel and located proximate a side of said block, said first and second channels having approximately the same width; and a receptacle having
  a housing, said housing having an opening whose size and shape generally corresponds to a size and shape of said second end of said plug body, said opening defining an inner surface,
  a spline on said inner surface of said housing, located near a centerline of said housing, said spline having a width which is approximately equal to said widths of said channels, and
  means for mounting said housing.

* * * * *